United States Patent Office 2,998,444
Patented Aug. 29, 1961

2,998,444
ACETYLENIC DIOLS AND DERIVATIVES THEREOF
John H. Biel, Milwaukee, Wis., assignor, by mesne assignments, to Lakeside Laboratories, Inc., Milwaukee, Wis., a corporation of Delaware
No Drawing. Filed Apr. 14, 1958, Ser. No. 728,116
5 Claims. (Cl. 260—482)

This invention relates to novel chemical compounds. More particularly, this invention is concerned with novel acetylenic diols and esters thereof.

This application is a continuation-in-part of my copending application Serial No. 572,608, filed March 20, 1956, now abandoned.

According to the present invention, novel acetylenic derivatives are provided having the formula

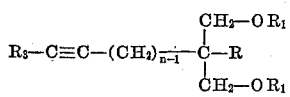

wherein $n$ is a whole integer from 1 through 6, R is a lower straight, branched or cyclic alkyl, lower unsaturated alkyl, a halogen containing lower alkyl or alkenyl, a monocyclic aryl, a halogen containing monocyclic aryl, a lower alkylene-monocyclic aryl, a lower alkylene halogen containing monocyclic aryl, or a lower alkyl-monocyclic aryl group; $R_1$ is hydrogen, an acyl group derived from a lower carboxylic acid, an acyl group derived from a lower aminocarboxylic acid, benzoyl, a monocyclic-lower carboxylic acid acyl group, a dicyclic-lower carboxylic acid acyl group, carbamyl, an aminocarbamyl group of the formula

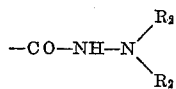

wherein $R_2$ is hydrogen, a lower straight, branched or cyclic alkyl, a monocyclic aryl group, a lower alkylene-monocyclic aryl group, a halogenated monocyclic aryl group or a halogenated monocyclic aryl-lower alkylene group; and $R_3$ has the same significance as $R_2$.

Thus, R may be groups such as methyl, ethyl, propyl, isopropyl, butyl, allyl, pentyl, ethenyl, octyl, cyclopentyl, cyclohexyl, phenyl, benzyl, phenethyl, o-chlorophenyl, 1-propylene-3-chlorobenzene and the like. $R_1$, in addition to hydrogen, may be acyl groups such as formyl, acetyl, propionyl, butyryl, trimethylacetyl, carbamyl, aminocarbamyl, benzoyl, diphenylacetyl, phenylacetyl, diphenylaminocarbamyl, diethylaminocarbamyl, diphenethylaminocarbamyl, aminoacetyl, alpha-aminopropionyl, alpha-amino-beta-phenylpropionyl and glutamyl. $R_2$ and $R_3$ may be groups such as hydrogen, methyl, ethyl, propyl, isopropyl, butyl, allyl, bentyl, ethenyl, octyl, phenyl, cyclobutyl, cyclohexyl, benzyl, phenyl, phenethyl, phenmethyl chlorophenyl or propylene-o-chlorophenyl.

The unesterified compounds of the above formula may be named 2-R-2-alkynyl-1,3-propanediol wherein R has the significance given previously. If R is methyl, the resulting compounds are 2-methyl-2-alkynyl-1,3-propanediols.

Preparation of the 2-R-2-alkynyl-1,3-propanediols may be conveniently accomplished by reduction of the corresponding diethyl ester (or other diesters) of the appropriate 2,2-disubstituted malonic acid. This reaction may be represented as follows:

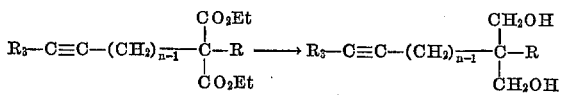

wherein R and $R_3$ have the significance mentioned above.

Some of the starting materials which may be used in this process, advisably in the form of lower alkyl esters, are 2-methyl-2-ethynyl malonic acid, 2-ethyl-2-propargyl malonic acid, 2-propyl-2-(3-butynyl)malonic acid and 2-butyl-2-(4-pentynyl)malonic acid. The preparation of diethyl 2-methyl-2-propargylmalonate is described by Cologne et al. in Bull. Soc. Chim. France, 1954 pp. 797–798, and also in Chemical Abstracts 49, 8797 (1955).

To effect the reduction, lithium aluminum hydride is preferred although other reducing agents may also be used in its place. The reduction is readily effected by contacting the appropriate diethyl ester with lithium aluminum hydride in an inert organic solvent such as ether, dioxane, tetrahydrofuran or the like. Elevated temperatures such as the reflux temperature enhance the reaction. After the reaction is terminated, water may be added to the mixture to decompose excess lithium aluminum hydride. The organic phase is separated and the aqueous residue extracted with the same solvent. The organic phase and extracts may then be combined, dried and the product distilled.

Representative of the 2-lower alkyl-2-alkynyl-1,3-propane diols so produced are 2-methyl-2-propargyl-1,3-propanediol, 2-ethyl-2-propargyl-1,3-propanediol, 2-methyl-2-ethynyl-1,3-propanediol, 2 - propyl-2-(3-butynyl)-1,3-propanediol and 2-butyl-2-(4-pentynyl)1,3-propanediol.

The 2-R-2-alkynyl-1,3-dicarbamyloxypropanes are conveniently produced by reacting the corresponding 2-R-2-alkynyl-1,3-propane diol with phosgene in an inert solvent. An acid-combining compound such as sodium hydroxide, antipyrine, dialkylaniline and the like is incorporated in the mixture to promote the reaction. The reaction proceeds quickly at room temperature to form the corresponding 2-R-2-alkynyl-1,3-propane dichlorocarbonate. After filtration, ammoniation of the dichlorocarbonate is effected by treating the filtrate with anhydrous ammonia or aqueous ammonium hydroxide. The resulting carbamate is conveniently recovered by filtration.

Some of the carbamates so produced are 2-methyl-2-propargyl-1,3-dicarbamyloxypropane, 2-ethyl-2-propargyl-1,3-dicarbamyloxypropane, 2 - methyl-2-ethynyl-1,3-dicarbamyloxy-propane and 2-propyl-2-(3-butynyl)-1,3-dicarbamyloxypropane.

Diesters (i.e., $R_1$=acyl groups other than carbamyl) of the 2-R-2-alkynyl-1,3-propanediols may be formed by the conventional esterification processes. Thus, the appropriate acylchloride or acylbromide may be reacted with the diol. Alternatively, an appropriate acid anhydride may be used for the esterification. The carboxylic acids themselves may, in addition, be used to form the esters.

The compounds of this invention, particularly as carbamates, have the ability to potentiate hypnotic agents, especially the bariturates and particularly pentobarbital, as determined by increased sleeping time that is obtained when the carbamate and hypnotic agent are administered concomitantly as compared to administration of the hypnotic agent alone. The novel compounds of this invention also induce a tranquilizing effect in animals. The compounds are also anticonvulsants and muscle-relaxants.

The following examples illustrate specific embodiments of the invention. It is to be understood, however, that the invention is not to be construed as limited to these examples.

EXAMPLE 1

2-methyl-2-propargyl-1,3-propanediol

To 30.8 g. (0.81 mole) of $LiAlH_4$ in 580 cc. of anhydrous ether was added 143 g. (0.675 mole) of diethyl 2-methyl-2-propargylmalonate dissolved in 300 cc. of anhydrous ether. After completion of the addition the mixture was refluxed for two hours. The excess $LiAlH_4$ was destroyed by adding 60 cc. of water and the complex destroyed by the addition of 800 cc. of 20% sulfuric acid. The ether layer was separated and the aqueous phase repeatedly extracted with ether. The combined ether extracts were dried with Drierite. The ether was distilled through a 10 inch column and the product collected at 109–111° C. (3 mm.); Yield 72 g. (84%); M.P., 69–70° C.

*Anal.*—Calcd. for $C_7H_{12}O_2$: C, 65.59; H, 9.44. Found: C, 65.64; H, 9.65.

EXAMPLE 2

*2-methyl-2-propargyl-1,3-dicarbamyloxypropane*

$$HC\equiv C-CH_2C(CH_3)-(CH_2OCONH_2)_2$$

Into 270 cc. of dry toluene was passed 30 g. (0.30 mole) of phosgene. To this solution was added 19.2 g. (0.15 mole) of 2-methyl-2-hydroxymethyl-4-pentyne-1-ol. After stirring at room temperature for one-half hour 114 g. (0.60 mole) of antipyrine dissolved in 125 cc. of chloroform was added with cooling. After completion of the addition the mixture was stirred for 20 hours at room temperature. The precipitate of antipyrine hydrochloride was removed by filtration and the filtrate added to 100 cc. of liquid ammonia. After all the ammonia had evaporated, the solid precipitate was collected by filtration and washed repeatedly with water to remove ammonium chloride; Yield 9.5 g., M.P. 125–126.5° C.

*Anal.*—Calcd. for $C_9H_{14}N_2O_4$: N, 13.08. Found: N, 13.05.

Various changes and modifications of the invention can be made and, to the extent that such variations incorporate the spirit of this invention, they are intended to be included within the scope of the appended claims.

What is claimed is:
1. A compound of the formula

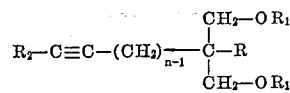

wherein $n$ is a whole integer from 1 to 6, R is a lower alkyl group, $R_1$ is a member of the group consisting of hydrogen and the carbamyl group, and $R_2$ is a member of the group consisting of hydrogen and lower alkyl groups.

2. 2-methyl-2-propargyl-1,3-propanediol.
3. 2-lower alkyl-2-propargyl-1,3-dicarbamyloxypropane.
4. 2-lower alkyl-2-lower alkynyl-1,3-propanediol.
5. 2-methyl-2-propargyl-1,3-propanediol dicarbamate.

References Cited in the file of this patent

UNITED STATES PATENTS

| 2,418,290 | Bruson et al. | Apr. 1, 1947 |
| 2,724,720 | Berger | Nov. 22, 1955 |

OTHER REFERENCES

Kharasch: Chem. Abst., vol. 43, columns 3775–6 (1949).

Ludwig et al.: J.A.C.S., vol. 73, pages 5779–80.

Miltown (published by Wallace Laboratories, New Brunswick, N.J., 1956), pages 6–24.